United States Patent [19]

Hagqvist

[11] Patent Number: 5,715,310
[45] Date of Patent: Feb. 3, 1998

[54] APPARATUS AND METHOD FOR ECHO ATTENUATION

[75] Inventor: Jari Hagqvist, Oulu, Finland

[73] Assignee: Nokia Mobile Phones Ltd., Salo, Finland

[21] Appl. No.: 359,044

[22] Filed: Dec. 19, 1994

[30] Foreign Application Priority Data

Dec. 23, 1993 [FI] Finland .................................. 935840

[51] Int. Cl.⁶ .......................... H04M 9/08; H04B 15/00
[52] U.S. Cl. .................... 379/406; 379/390; 379/409; 379/392; 381/57; 381/94
[58] Field of Search ........................... 379/406, 410, 379/411, 409, 388, 389, 390, 392, 420; 381/57, 94

[56] References Cited

U.S. PATENT DOCUMENTS

| | | | |
|---|---|---|---|
| 3,889,059 | 6/1975 | Thompson et al. | 379/390 |
| 4,560,840 | 12/1985 | Hansen | 379/339 X |
| 4,630,304 | 12/1986 | Borth et al. | 381/94 |
| 5,058,153 | 10/1991 | Carew et al. | 379/390 |
| 5,099,472 | 3/1992 | Townsend et al. | 379/390 X |
| 5,357,567 | 10/1994 | Barron et al. | 379/390 |
| 5,381,473 | 1/1995 | Andrea et al. | 379/387 |
| 5,398,281 | 3/1995 | Kurokawa et al. | 379/390 |
| 5,471,528 | 11/1995 | Reesor | 379/390 |
| 5,485,515 | 1/1996 | Allen et al. | 379/390 X |
| 5,485,522 | 1/1996 | Solve et al. | 381/56 |
| 5,548,638 | 8/1996 | Yamaguchi et al. | 379/409 X |

*Primary Examiner*—Krista Zele
*Assistant Examiner*—Devendra T. Kumar
*Attorney, Agent, or Firm*—Perman & Green, LLP

[57] ABSTRACT

The invention provides an apparatus and method and a device for echo attenuation in a telephone. According to the invention, the echo attenuation in the telephone is adapted to the background noise such that the ambient background noise in telephone (10) is measured with a noise detector (1) and the noise level is determined in a background noise measurement unit (2). The background noise that has been determined is used to set the attenuation parameters in parameter determining unit (3). The signal level received from the other subscriber's telephone (11) is measured in input signal level measurement unit (4). The feed signal of the telephone is attenuated in attenuation Control unit (6) on the basis of the attenuation values calculated, which have been determined from the attenuation parameters and the signal level received by the other subscriber in output signal attenuation determining unit (5).

17 Claims, 2 Drawing Sheets

APPARATUS AND METHOD FOR ECHO ATTENUATION

FIELD OF INVENTION

The present invention relates to apparatus and method for echo attenuation particularly in a telephone.

BACKGROUND TO INVENTION

DE Pat. Application A1 38 39 627 discloses A telephone comprising an echo attenuator connected to an outgoing line, another attenuator connected to the outgoing and an incoming line, and control means for controlling the other attenuator. The control means is used to control the other attenuator such that the sum of the attenuation values of the other attenuator and the attenuation value of the echo attenuator (and/or the echo path) is constant. In this case, the telephone adjusts both the intensity of the received speech and the intensity of the speech to be transmitted. Such an apparatus and method inhibits acoustic feedback from the handset loudspeaker to the microphone, and thus a user does not hear their own voice as an echo in the earpiece of their own telephone.

The attenuation arrangement described above has a drawback in that the speech attenuation in the telephone brings about unpleasant audible variations of the signal level in the loudspeaker of the receiving telephone. If, for instance, there Is intense background noise around the telephone, such noise will be received by the other person's telephone in an attenuated form when this person is speaking. The attenuation also affects double talking so that the conversation may perhaps not be fully duplex. This of course depends on the attenuation degree.

BRIEF SUMMARY OF INVENTION

In a first aspect of the present invention there is provided a method for attenuating echo in a telephone comprising: measuring ambient background noise for a first telephone for determining a noise level;

setting attenuation parameters corresponding to the noise level; measuring a signal level received from a second telephone; calculating The attenuation for an output signal from the first telephone corresponding to the attenuation parameters and the level of the received signal; and attenuating the output signal, and in a second aspect there is provided apparatus for attenuating echo in a telephone, comprising:

a noise detector for detecting background noise;

a background noise measurement unit for determining a measured noise value;

a parameter value determining unit, to which the measured noise value is fed from the background noise measurement unit;

an input signal level measurement unit;

an output signal attenuation determining unit, having inputs connected to the parameter determining unit and the Input signal level measurement unit; and an attenuation control unit for adjusting the output signal level in accordance with the parameter values and the input signal level.

An advantage of the present invention is that it provides a simple and reliable method and device for echo attenuation.

The present invention utilizes the insight and the surprising and unexpected fact that background noise masks the return echo signal of the speech of the second subscriber, i.e. the person at the other end, in such a way that it cannot be heard as easily as when relative silence, i.e. a low background noise, is prevailing. This is a characteristic of human hearing (called masking). The Invention has a further advantage of taking account of the fact that a telephone, especially a mobile telephone or similar, is used in various conditions and acoustic surroundings, and hence the attenuation intensity is adapted to conditions in order to achieve a good echo attenuation. The present invention involves the unexpected and surprising expedient of decreasing the attenuation level when the noise level increases.

DETAILED DESCRIPTION OF EMBODIMENTS OF THE INVENTION

Figure 1:
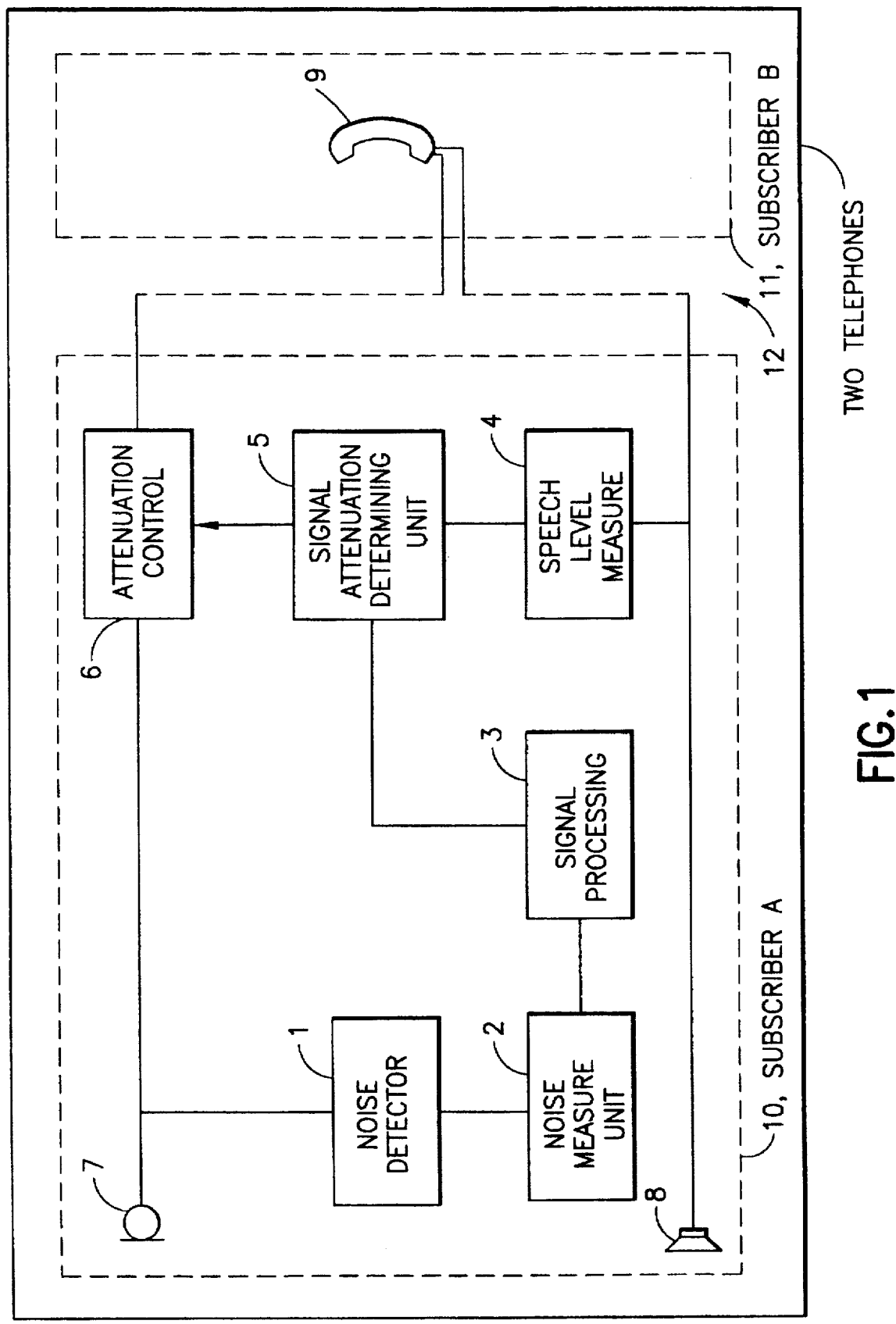
FIG. 1 shows apparatus in accordance with the invention for attenuating echo in a telephone and FIG. 2 shows a flowchart for the operation of the apparatus of FIG. 1.

FIG. 1 is a schematic view of a telephone 10 of a calling subscriber, (subscriber A), a telephone 11 of a person at the other end from the calling subscriber (subscriber B), and connecting line 12, which can be a wire or a radio path and pass through one or more switchboards. Regarding telephone 10 of subscriber A, the figure only shows the microphone 7 and loudspeaker 8 end elements relevant to apparatus for attenuating echo in a telephone. As for telephone 11 of subscriber B, only the handset 9 is shown. The other parts can be parts of a telephone or telephone network known per se, and are not pertinent to the instant invention, thus they are not described further.

Telephone 10 comprises echo attenuation circuitry including a noise detector 1, a background noise measurement unit 2, to which noise detector 1 is connected, a signal processing parameter determining unit 3, to which the noise measurement value is fed from the background noise measurement unit 2, and a unit 4 for measuring the level of the speech signal to be received, the echo attenuation circuitry further comprises a unit 5 for determining the attenuation of an output signal. Unit 5 has its inputs connected with parameter the determining unit 3 and the input signal level measuring unit 4. The circuitry also comprises an attenuation control unit 6 for adjusting the output signal level on the basis of instructions provided by the attenuation determining unit 5. Noise detector 1 detects whether the signal from the microphone 7 of telephone 10 of subscriber A is speech or background noise using well known techniques, an example of which is identified later. Noise detector 1 is preferably connected with the microphone 7 of the telephone. The acoustic field of the environment, i.e. the background noise, is measured by means of measurement unit 2, in case noise detector 1 detects only background noise in the microphone signal. The background noise measurement results are transferred to parameter determining unit 3. The noise level is determined as the average of a long period, preferably 1 to 2 seconds. The parameter determining unit 3 determines the attenuation parameters to be adopted. It comprises a storage unit, in which a number of parameters and background noise threshold values have been stored, and a comparator unit, in which the amount of background noise measured is compared to the threshold values for background noise. Depending upon the comparator result the parameters are set. Then the attenuation parameter which is optimal for the determined noise level and the threshold values set for the background noise is selected. The threshold levels can be predetermined empirically or experimentally by a person of ordinary skill in the art using well known test procedures and then stored in the parameter determining unit 3.

The determination of the parameter set to be used on a given measured noise level may be carried out as follows. At the beginning of the cell, a number of predetermined parameters "parameter set 0" is used for echo attenuation. After this, the noise level is measured, i.e. the average momentary noise over 1 to 2 seconds. The noise level is compared to the threshold values of a range of preset threshold values, "threshold value N", in which N =1, 2, 3 . . . i.e. a positive integral number. Each threshold value "threshold value N"correlates with a number of parameters "parameter set N". As the noise level passes "threshold value N", but not "threshold value (N +1)", "parameter set N", corresponding to "threshold value N", is set as a parameter set. After the choice of the parameter set to be adopted, normal speech processing can be performed in a manner known to a person skilled in the art. The attenuation action Of "parameter set N"is lower than that of "parameter set (N–1)", i.e. as the noise level increases the attenuation decreases.

The parameter determining unit 3 described above can be accomplished in another way. In this case, the parameter determining unit 3 includes a calculation unit, by means of which the parameters can be calculated directly on the basis of the background noise, i.e. the noise level measured. The higher the noise level, the less the parameters attenuate.

Figure 2:
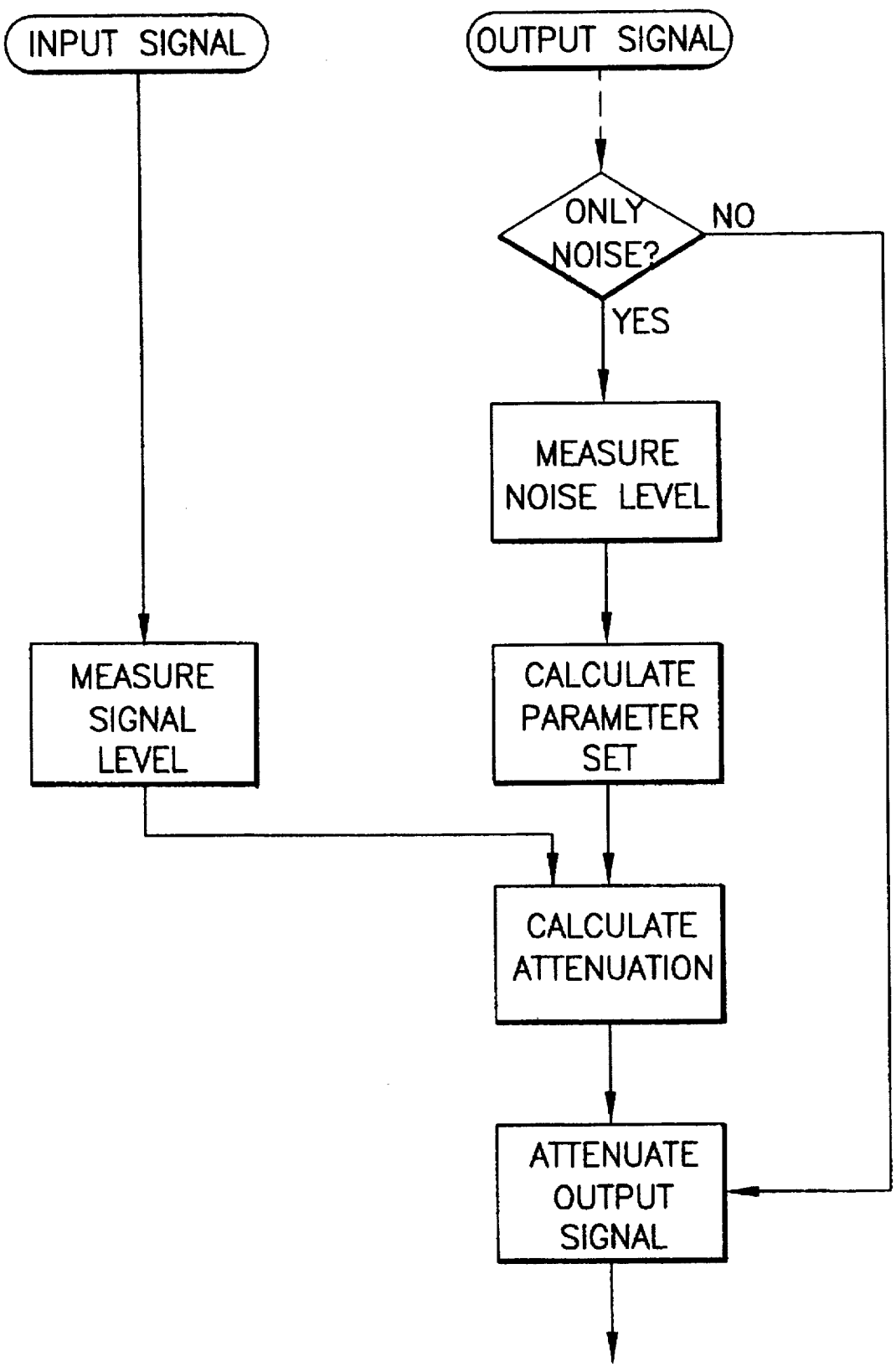

The attenuation parameters Included in the parameter set imply maximal attenuation carried out with regard to speech, and e.g., attenuation as a function of frequency. Echo attenuation apparatus in accordance with the invention operates as follows and as shown in FIG. 2. As subscriber A starts a call, checks are made to determine whether a speech signal or merely ambient noise is heard over microphone 7. The existence of this noise and/or speech can be checked by noise detector 1 by using known techniques (e.g. a GSM Voice Activity Detector VAD). If speech is detected at the outset, a predetermined basic attenuation is carried out (cf. "parameter set 0"above). When only noise is detected, virtual adaptive attenuation adjustment is performed by first measuring the prevailing noise level with the background noise measurement unit 2. After this, the attenutation parameters are determined with parameter measurement unit 3 by using either of the techniques described above. The attenuation required for the output signal of subscriber A is determined in the attenuation measurement unit 5 of the output signal by using the input signal level data provided by measurement unit 4. On the basis of the attenuation thus determined, the output signal level is adjusted by control unit 6. The ambient noise level is determined with continuous measurement each time the noise detector detects background noise, so that echo attenuation adapts to shifts in the background noise smoothly and swiftly. The attenuation parameters obtained will be maintained until new parameters have been set.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A method for attenuating echo in a telephone comprising:

measuring ambient background noise for a first telephone (10) for determining a noise level;

setting attenuation parameters corresponding to the noise level;

measuring a signal level received from a second telephone (11);

calculating the attenuation for an output signal from the first telephone (10) corresponding to the attenuation parameters and the level of the received signal; and attenuating the output signal based upon the calculated attenuation;

wherein the attenuation parameters are derivable from a plurality of attenuation parameter sets, from which a most suitable set is selected corresponding to the determined noise level, predetermined background noise threshold values that have been set, and the received signal.

2. A method according to claim 1, wherein the attenuation parameters are calculated directly from the determined noise level and the received signal.

3. A method according to claim 1, wherein the noise level is determined as an average of a long period.

4. A method according to claim 3, wherein the period lies in the range of 1 to 2 seconds.

5. An Apparatus for attenuating echo in a telephone, comprising:

a noise detector (1) for detecting background noise;

a background noise measurement unit (2) for determining a measured noise value;

a parameter value determining unit (3), to which the measured noise value is fed from the background noise measurement unit (2);

an input signal level measurement unit (4);

an output signal attenuation determining unit (5), having inputs connected to the parameter determining unit (3) and the input signal level measurement unit (4); and an attenuation control unit (6) for adjusting the output signal level in accordance with the parameter values and the input signal level.

6. An Apparatus according to claim 5, wherein noise detector (1) for detecting background noise is connected to the microphone (7) of the telephone.

7. An Apparatus according to claim 5, wherein the parameter determining unit (3) comprises a calculating unit for calculating the parameters from the background noise measured.

8. An apparatus according to claim 5, wherein the noise detector is a GSM Voice Activity Detector.

9. A method for attenuating echo in a telephone comprising:

measuring ambient background noise for a first telephone for determining a noise level;

setting attenuation parameters corresponding to the noise level;

measuring a signal level received from a second telephone;

calculating an attenuation for an output signal from the first telephone corresponding to the attenuation parameters and the level of the received signal and attenuating the output signal based upon a calculated attenuation; wherein the step of setting comprises the steps of comparing the noise level to preset threshold values, each of the preset threshold values correlating with a respective number of attenuation parameters; and selecting the respective number of attenuation parameters which correspond to an Nth one of the threshold values exceeded by the noise level, for a case in which the noise level does not exceed an (N+1)th one of the threshold values.

10. A method according to claim 9, wherein the preset threshold values and the number of parameters are stored in a parameter determining unit.

11. A method according to claim 9, wherein the number of parameters are calculated based upon the measured noise level.

12. An apparatus for attenuating echo in a telephone having a microphone, said apparatus being located within the telephone, comprising:

a noise detector having an input connected to an output of said microphone, said noise detector for detecting whether a signal received by said microphone comprises speech or background noise;

a background noise measurement unit having an input coupled to an output of said noise detector, said background noise measurement unit for measuring the level of background noise included in a signal output by said noise detector;

a parameter determining unit for determining attenuation parameters based upon the level of background noise measured by said background noise measurement unit;

an input signal measuring unit for measuring the level of speech included in a signal received by said telephone from another communication device;

an attenuation determining unit for calculating, based upon an output of said input signal measuring unit and an output of said parameter determining unit, an attenuation required for a signal that is to be transmitted by said telephone; and an attenuation control unit for attenuating, based upon an attenuation calculated by said attenuation determining unit, the signal that is to be transmitted by said telephone.

13. An apparatus according to claim 12, wherein the parameter value determining unit comprises a storage unit for storing a parameter set and background noise thresholds, and a comparator unit for comparing measured background noise with the background noise thresholds and thereby selecting the attenuation parameters.

14. An apparatus according to claim 12, wherein the noise detector is a GSM Voice Activity Detector.

15. An apparatus according to claim 12, wherein said parameter determining unit comprises means for calculating said attenuation parameters based upon the level of background noise measured by said background noise measurement unit.

16. An apparatus for attenuating echo in a telephone having a microphone, said apparatus being located within the telephone, comprising:

a noise detector having an input connected to an output of said microphone, said noise detector for detecting whether a signal received by said microphone comprises speech or background noise;

a background noise measurement unit having an input coupled to an output of said noise detector, said background noise measurement unit for measuring the level of background noise included in a signal output by said noise detector;

a parameter determining unit for determining attenuation parameters based upon the level of background noise measured by said background noise measurement unit;

an input signal measuring unit for measuring the level of speech included in a signal received by said telephone from another communication device;

an attenuation determining unit for calculating, based upon an output of said input signal measuring unit and an output of said parameter determining unit, an attenuation required for a signal that is to be transmitted by said telephone; and an attenuation control unit for attenuating, based upon an attenuation calculated by said attenuation determining unit, the signal that is to be transmitted by said telephone;

wherein the parameter determining unit has a range of preset threshold values and a number of attenuation parameters stored therein, and wherein each of the preset threshold values correlates with a respective at least one of the attenuation parameters.

17. An apparatus according to claim 16, wherein the parameter determining unit further comprises means for comparing the background noise measured by said background noise measurement unit to the range of preset threshold values; and means for selecting the respective at least one of the attenuation parameters which corresponds to an Nth one of the threshold values exceeded by the measured background noise, for a case in which the measured background noise does not exceed an (N+1)th one of the threshold values.

* * * * *